May 7, 1963 P. J. M. CARREY 3,088,700
UNIVERSAL SAFETY PARACHUTE CONNECTOR
Filed Aug. 28, 1961
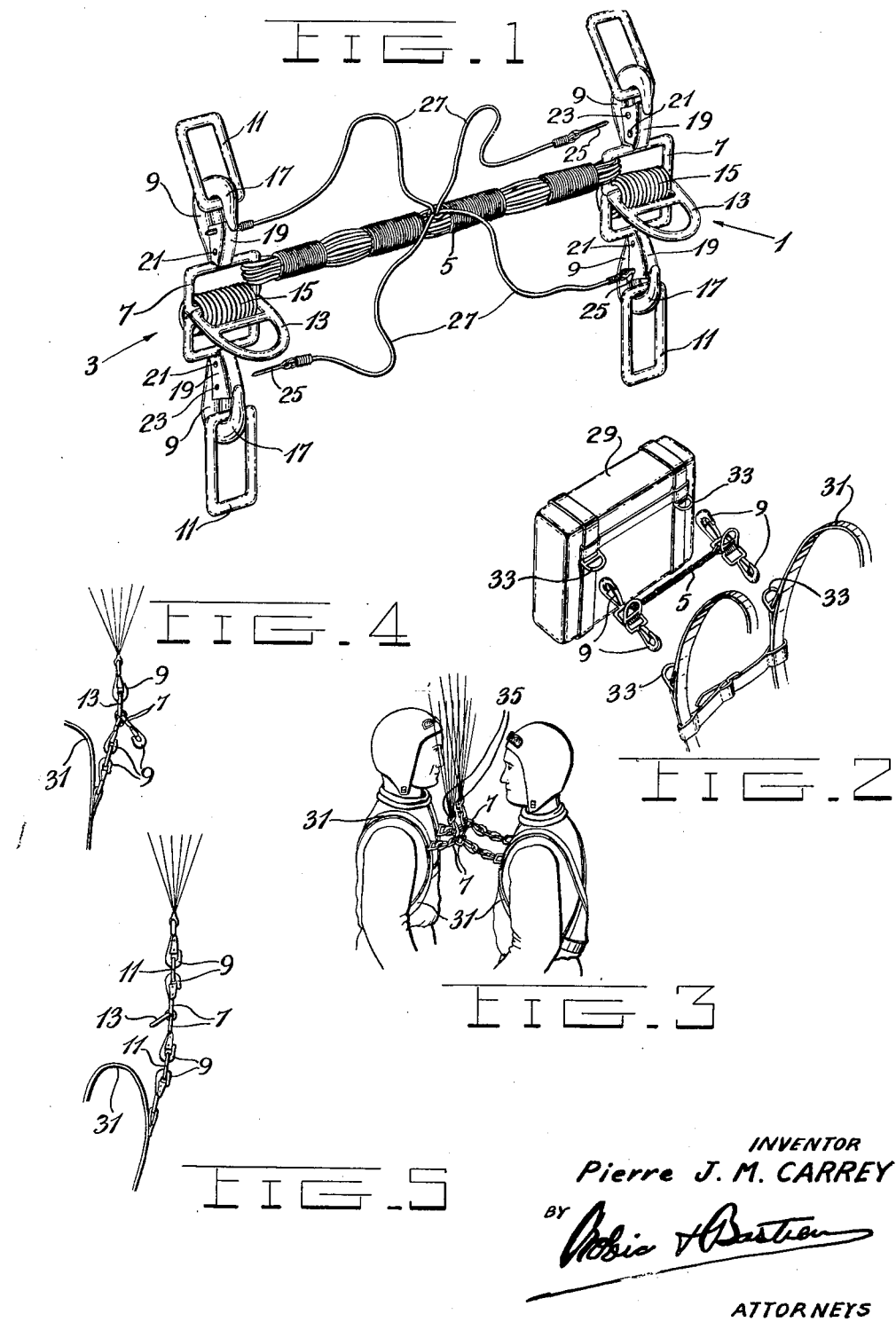
INVENTOR
Pierre J. M. CARREY
BY
ATTORNEYS

United States Patent Office 3,088,700
Patented May 7, 1963

3,088,700
UNIVERSAL SAFETY PARACHUTE CONNECTOR
Pierre Joseph Marie Carrey, 17 Boulevard Zola,
Aix-en-Provence, France
Filed Aug. 28, 1961, Ser. No. 134,299
3 Claims. (Cl. 244—151)

The instant application pertains to a parachute safety device and more particularly to a connecting device for joining a parachute pack to a parachute harness.

The type of connecting device contemplated by the instant invention is so designed that it will permit the use of the same parachute by two persons. The device is intended to be used whenever there is a shortage of parachutes in an airplane or where one of the passengers is physically disabled and would, otherwise, be unable to jump by himself.

As a further safety precaution, the connecting device of the invention makes it possible to accommodate a second reserve chute for use where both the back parachute and the regular reserve chute should open simultaneously and become entangled.

Also tying elements for joining a reserve parachute pack to a harness worn by the user are generally of two kinds: the D-shaped ring and the spring-loaded snap hook. As is known, these snap hooks are provided with a retractable and pivotable detent member which is spring urged against the inner surface of the end of the arcuate portion of the hook. In use, the reserve parachute pack which comes separate, is attached to the harness by mating the D-shaped rings and the snap hooks. However, as often happens, some or all of the packs with which the airplane is equipped are provided with tying elements which do not match those of the harnesses worn by the crew and passengers. In other words, both the packs and harnesses may be provided with the same type of tying elements, either rings or snap hooks. In an emergency, these packs would become absolutely useless because of the non-mating tying elements.

It is therefore a principal object of the invention to provide a safety connection for parachutes which will allow two persons to be tied to the same parachute.

A further object of the invention lies in the provision of a safety connecting device of the aforesaid type which will permit to accommodate a second reserve parachute.

It is also an object of the present invention to provide a safety device for parachutes which will permit the matching of a parachute pack to a harness even though the two are equipped with non-mating tying elements.

Finally, another object of the invention resides in the provision of a safety device for parachutes having means thereon preventing the collapse of the parachute if one of the two tying units should become detached from the harness or from the lift web of the parachute itself.

These objects of the invention are attained by the provision of a safety connecting device for joining a parachute pack to a parachute harness which are provided with non-mating elements, said device comprising at least two tying elements of a type capable of mating the tying elements of said pack and harness. Preferably, the device is composed of a pair of tying units wherein each unit has two sets of tying elements and each set consists of two mating tying elements joined together; one element being fixed to an element of the other set and wherein means for joining the two elements together are provided. One tying element of each set is capable of mating the tying elements of both pack and harness.

A better understanding of the invention will be afforded by the following description of a preferred and specific embodiment of the invention, said description having reference to the accompanying drawings wherein:

FIG. 1 is a perspective view in elevation of the safety device of the invention, FIG. 2 shows the safety device about to be applied to a harness and a pack, FIG. 3 illustrates the use of a single parachute by two persons with the safety device of the invention, FIGS. 4 and 5 are elevation views of the safety device as applied to a harness and parachute having tying elements of a type different from those of FIG. 2.

The connecting device shown generally comprises two tying units 1 and 3 joined together substantially at their center by means of a flexible composite cord 5.

Each unit comprises a central member 7 in the form of a buckle provided, at each end thereof, with spring urged snap hooks 9. To each of these snap hooks are releasably fixed tying rings 11 which, in this case, are rectangular in configuration but which could also be annular.

Each buckle may also be provided with an extra tying ring 13, preferably of the D shape, tied to the central portion by means such as wound cord or wire 15.

Each snap hook 9 consists of an arcuate hook portion 17 and a spring-loaded detent 19 pivotable as at 21 and coming to abut against the inner surface of the tip of arcuate hook portion 17. Extending through each detent, and near the free end thereof, apertures 23 are provided for the reception of pins 25 adapted to lock the detent into closed position. Each pin should be connected to a string 27 tied to the composite cord 5 so that they will not become lost.

As said previously, the safety connecting device is for use when parachute packs and harnesses are provided with non-mating or matching tying elements such as shown in FIGURES 2, 4 and 5 wherein the two possibilities are illustrated. In the case of FIGURE 2, both the pack 29 and harness 31 are provided with D-rings 33. It will therefore be realized that the harness and pack cannot be made to match unless a device as contemplated by the invention is used. In the case of FIG. 2, the user of the parachute would only have to remove the rings 11 from the connecting device in order to connect the pack and harness.

The illustration of FIG. 3 shows how two persons may be hooked onto the same parachute. In such a case, the tying elements 9 or 11 would be hooked on directly to the harnesses 31 of each person while the parachute itself would be tied to the buckles 7 through the lift webs 35 of the parachute.

It can also be appreciated that the combination shown in FIGURE 3 could be used with or without the usual back parachute.

FIGURES 4 and 5 illustrate another possibility wherein both the pack or parachute and the harness are provided with snap hooks. In such a case, as shown in FIG. 5, the tying elements which in this case are tying rings 11 would be tied directly to the snap hooks 9 of the parachute and harness. It would also be possible to tie the hook 9 of the parachute or harness to the central element or buckle 7 and leave the other snap hook 9 free and unused. This case is particularly illustrated in FIG. 4.

The advantage of flexible composite cord member 5 is shown in the case where one of the two tying units 1 or 3 should become loose either from the parachute or the harness. If it were not for the retraining action of the composite cord 5, one of the two lift webs of the parachute would be flying away and the parachute itself would finally collapse. The presence of cord 5 prevents this eventuality.

Although a specific embodiment of the invention has been described, it should only be taken as illustrative and the scope of the invention should only be construed from the appended claims.

I claim:
1. A safety adaptor for joining a parachute pack to a parachute harness or the like, the harness and pack having non-mating fastening elements, said device comprising:
   (a) a pair of fastening units;
   (b) each unit having two independent sets of fastening elements;
   (c) each set consisting of two interconnected mating fastening elements;
   (d) one element of one set being fixed to an element of the other set;
   (e) means for joining the two units together;
   (f) a parachute pack;
   (g) a parachute harness;
   (h) first connecting elements connected to said parachute pack and second connecting elements connected to said parachute harness;
   (i) said first connecting elements each being detachably connected to one of said fastening elements of one of said sets of one of said units;
   (j) and said second connecting elements each being detachably connected to one of said fastening elements of a second one of said sets of one of said units.

2. A safety adaptor for joining a pair of parachute harnesses, comprising:
   (a) two fastening units, each having a central rigid member with opposite ends;
   (b) a spring loaded snap hook connected to each of said rigid member ends;
   (c) a closed fastening ring operatively connected to the hook end of each snap hook;
   (d) a further closed fastening ring secured centrally of each central member; and,
   (e) flexible means joining the central member of each unit together;
   (f) a pair of parachute harnesses;
   (g) fastening elements connected to said harnesses and each detachably connected to one of said fastening rings.

3. A safety adaptor for joining two parachute harnesses to the same parachute, or the like, said harnesses being provided with non-mating alike fastening elements, said device comprising:
   (a) two fastening units each being formed of two spring loaded snap hook members having a loop end and a hook end, and three closed rings;
   (b) the loop ends of the two hook members and one closed ring being integrally interconnected;
   (c) the other two closed rings being freely engaged each in a hook end of said hook members; and
   (d) flexible cord means for joining said fastening units together by interconnecting the loop ends of one hook member of each unit;
   (e) a parachute detachably connected to said integrally connected ring;
   (f) a pair of parachute harnesses detachably connected to said other closed rings.

References Cited in the file of this patent
UNITED STATES PATENTS

| | | |
|---|---|---|
| 1,877,702 | St. Clair | Sept. 13, 1932 |
| 2,130,567 | Smith | Sept. 20, 1938 |
| 2,914,273 | Bolton et al. | Nov. 24, 1959 |
| 2,979,028 | Zakely | Apr. 11, 1961 |